United States Patent
Bovellan et al.

[11] Patent Number: 5,498,044
[45] Date of Patent: Mar. 12, 1996

[54] ENERGY ABSORBENT BUMPER FOR MOTOR VEHICLES

[75] Inventors: Kent Bovellan; Pär Braun, both of Trollhättan, Sweden

[73] Assignee: Saab Automobile Aktiebolag, Sweden

[21] Appl. No.: 168,540

[22] Filed: Dec. 16, 1993

[30]    Foreign Application Priority Data

Dec. 21, 1992 [SE] Sweden ................................ 9203837

[51] Int. Cl.⁶ .................................................. B60R 19/18
[52] U.S. Cl. ............................................ 293/120; 293/155
[58] Field of Search ................................. 293/102, 120, 293/121, 136, 155

[56]                 References Cited

U.S. PATENT DOCUMENTS

| 4,361,352 | 11/1982 | Wamamatsu | 293/120 |
| 4,733,894 | 3/1988 | Lamparter | 293/120 |
| 5,154,462 | 10/1992 | Carpenter | 293/120 |

FOREIGN PATENT DOCUMENTS

| 2846404 | 5/1980 | Germany . | |
| 78844 | 5/1983 | Japan | 293/102 |
| 211942 | 12/1983 | Japan | 293/102 |
| 2055446 | 3/1981 | United Kingdom | 293/120 |

*Primary Examiner*—Dennis H. Pedder
*Attorney, Agent, or Firm*—Ostrolenk, Faber, Gerb & Soffen

[57]              ABSTRACT

A motor vehicle bumper for energy absorption. A support part of the bumper is supportable on the vehicle and is generally U-shaped with horizontally extending arms. A cover supported on the support includes respective wall sections that extend in from the top and bottom of the cover and cooperate with vertically outwardly extending flanges on the legs of the U. The wall sections of the cover are simply locked to the flanges of the support. A body of energy absorbing material is disposed in the cover and in the support and is pressed against the wall sections of the cover upon deformation of the cover by application of more than a predetermined force to press the energy absorbing material against the cover wall sections to prevent those wall sections from separating from the flanges of the legs of the U-shaped support in the event of collision or application of more than a predetermined force to the cover of the bumper.

6 Claims, 1 Drawing Sheet

ENERGY ABSORBENT BUMPER FOR MOTOR VEHICLES

BACKGROUND OF THE INVENTION

This invention relates to an energy absorbent vehicle bumper having a support on the vehicle, A covering over the support and energy absorption means between them. In addition, the invention concerns retention of the covering over the support in the event of impact upon the covering mechanism.

To avoid panel damage to vehicles from collisions occurring during parking maneuvers, in traffic jams, in confined garages, etc., the vehicles are fitted with bumpers which are capable of absorbing the impact of a collision up to a certain speed without damage to the vehicle. A conventional vehicle bumper incorporates a strong steel bar which extends across the vehicle and is secured to the supporting elements of the vehicle. A continuous elastic casing conceals the steel bar and an energy absorbing mechanism is secured to the rail. To prevent the casing from loosening and becoming torn off in a manner dangerous to other traffic in the event of a collision, the casing is secured to the steel bar with a relatively large number of bolted joints. The bolted joints render the bumper more expensive to produce and complicate its assembly.

To simplify assembly of a bumper, German patent specification DE 27 02 691 A discloses a bumper casing with continuous hooks which slide into corresponding recesses in the rail so that they lock. This solution obviously simplifies the bumper assembly, but it is unsuitable in terms of road safety because the hooks can easily be deformed in the event of a collision, causing the casing to become detached from the rail.

British patent GB 2,151,993 C, in FIG. 3, shows a bumper with a casing constructed with V-shaped openings, each of which clamps round one edge of a rail that is firmly secured to the vehicle. The purpose of this design is to prevent the casing from being ripped off vertically in the event of a collision. But, because the interaction between the respective V-shaped openings and the edge is alone unable to prevent vertical displacement of the casing, the energy absorbing mechanism must consist of a foam which is sprayed into the entire continuous space between the casing and the rail and which, when it solidifies, adheres to both the rail and the casing to ensure that the bumper forms one coherent unit.

Manufacture of the foregoing bumper involves the use of complicated production equipment which increases the cost of the bumper. Moreover, because the energy absorbing material is secured to both the casing and the rail, it is impossible merely to replace the part that became damaged after a minor collision. Instead, the entire bumper must be replaced, which is obviously unnecessarily costly to the owner of the vehicle.

SUMMARY OF THE INVENTION

The objects of the invention are to eliminate the mentioned disadvantages of prior art bumpers and to provide a bumper whose parts are simple to join together to form a preassembled unit, which is in turn simple to assemble on a vehicle, to absorb collision forces, without the casing loosening in a manner that might prove dangerous to other traffic.

To achieve this object, the invention concerns a motor vehicle bumper for energy absorption, comprising a support of the bumper which is supportable on the vehicle and is generally U-shaped, including horizontal, outwardly extending arms. A cover or casing is supported on the support. It includes respective wall sections that extend down from the top and up from the bottom of the cover to engage and cooperate with vertically outwardly extending flanges on the legs of the U of the support, the cover being thereby simply locked to the flanges of the support. A body of energy absorbing material is disposed in the covering and in the U of the support and is pressed against the wall sections of the cover upon deformation of the cover by application of more than a predetermined force. The pressure of the energy absorbing material against the wall sections of the cover prevents those wall sections from separating from the flanges of the legs of the U-shaped supporting mechanism and holds the cover on the support in the event of collision or application of more than a predetermined force to the cover of the bumper.

The invention provides a relatively simple, low cost locking mechanism to fix the casing or cover to the support, assuming normal handling of the bumper, i.e. during assembly and normal operation of the vehicle. In the event of a collision, the energy absorbing mechanism is pressed against the cover, which is in turn pressed against the support, reinforcing the locking action of the cooperating locking elements and ensuring that the cover is not ripped off.

Other objects and features of the invention are described in the following description of an embodiment exemplifying the invention, referring to the accompanying drawings.

DESCRIPTION OF A PREFERRED EMBODIMENT

Figure 1:
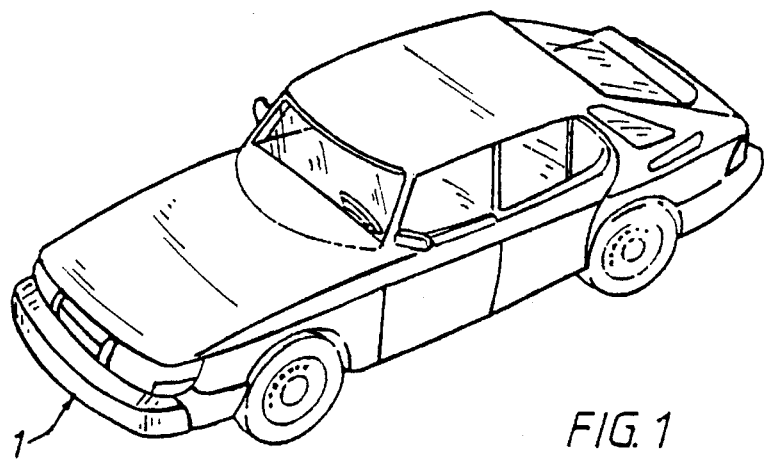
FIG. 1 shows a vehicle equipped with a bumper according to the invention.

FIG. 1 shows a vehicle with a bumper 1 which lies outside the front section of the vehicle body and extends horizontally across the vehicle to protect it from impacts. The bumper is arranged to be deformed during energy absorption when subjected to a collision force which exceeds a predetermined force. The vehicle also has a rear bumper outside the rear section of the vehicle.

Figure 2:
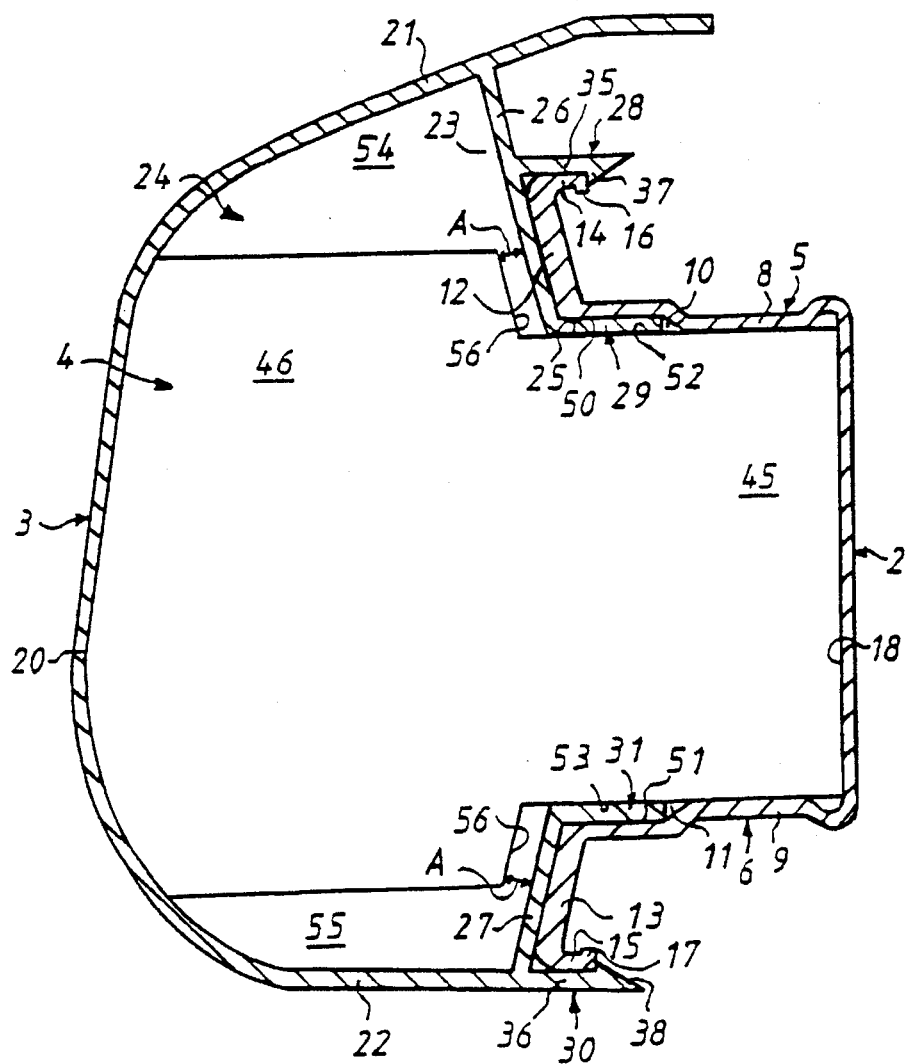
FIG. 2 shows an elevational cross-section of a bumper according to the invention.

FIG. 2 shows the bumper 1. It includes a continuous support 2 which extends across the vehicle and is designed to be secured to supporting elements of the vehicle. A continuous cover or casing 3 is secured to the support 2 and covers the support 2 wholly or in part. An energy absorbing mechanism 4 is arranged between the cover 3 and the support 2 and is designed to be deformed when it is subjected to a predetermined force.

The support 2 is comprised of at least one light metal rail and a molded panel, or the like, extending across the vehicle. It has an essentially U-shaped cross-section with first flanges extending out from the vehicle, i.e. legs 5, 6 which extend forward, and leg 5 is above the parallel to leg 6. Part of the cover 3 and the energy absorbing mechanism 4 are arranged between the legs 5, 6. Each leg 5, 6 is designed with an indentation or embossment 8 and 9, respectively, which serves as a support shoulder for the energy absorbing mechanism 4 and also delimits a recess 10, 11 which extends along the entire support 2. The legs 5, 6 of the U include respective outwardly directed (up and down) flanges 12, 13 having respective outer ends 14, 15 which are bent rearward and in toward the vehicle, viewed in the longitudinal direction of the vehicle, and those flanges have respective inwardly directed projections or shoulders 16, 17, which are arranged to receive the respective locking mechanisms 28, 30, described below, of the cover 3 by means of snap locking. It is also possible to design the support 2 and its adjacent parts so that each flange 12, 13 is inwardly directed toward the other flange, rather than outwardly directed, without departing from the inventive concept.

Cover 3 also extends along the entire bumper 1. It has the shape of an elastic protective casing and has rubber-like hardness. It includes a front, essentially vertical wall 20, which merges into an upper and a lower rearwardly directed wall 21, 22, which walls extend toward the vehicle body to seal a gap between the bumper and the vehicle body, thereby concealing both the energy absorbing mechanism 4 and the support 2. Cover 3, like support 2, can, of course, be constructed from a number of interacting parts for covering the entire width of the bumper.

A wall 23 is formed between and extends between the upper and lower walls 21, 22. The wall 23 constitutes the rear limit of a continuous cavity 24 into which energy the absorbing mechanism 4 extends. Wall 23 may be solid across the entire space between the walls 21 and 22 or, as in this illustrated embodiment, may have a longitudinal opening 25, running in the horizontal direction, which divides the wall into first inwardly directed sections, i.e, into upper and lower wall sections 26, 27. Each wall section 26, 27 has two, but there may be more, vertically separated sections 28, 29 and 30, 31, respectively, which extend rearward in the longitudinal direction of the vehicle and which are advantageously, but not necessarily, parallel to each other.

The outermost ones of these sections 28, 30 are hereafter referred to as locking mechanisms 28, 30 because they are used for locking the cover 3 to the support 2. Locking mechanisms 28, 30 constitute integral parts of the cover 3. Each mechanism 28, 30 incorporates a respective continuous arm 35, 36 having an end section with a respective hook-like projection 37, 38 designed to clamp with locking action around the cooperatingly placed edge 16, 17 of the support 2. In an alternative embodiment, it is obviously possible to design sections 28, 30 instead with a respective recess intended to receive a hook-like projection from the support 2. It is also possible to use a combination of these variants.

Because locking mechanisms 28 30 form part of the relatively flexible cover 3, their locking action tends to reduce when the bumper is subjected to a collision force which exceeds a preset force.

The other vertically innermost section 29, 31 of the wall sections 26, 27 are hereafter referred to as flanges 29, 31. The flanges slide into respective grooves 10, 11 defined in the legs 5, 6 of the support 2. The flanges 29, 31 are designed with respective outer, first support faces 50, 51, which rests against the support 2 and respective inner, second support faces 52, 53, which rests against the energy absorbing mechanism 4 to fix its position relative to both the cover 3 and the support 2.

Energy absorbing mechanism 4 is fabricated from a shock absorbing material, e.g. foam plastic, cellular plastic or rubber. It is designed with an inner, nearer to the vehicle shorter section 45 and an outer taller height section 46 and it is manufactured in one piece. The inner shorter section 45 extends between the legs 5, 6 of the support 2, and rests against an essentially vertical central section 18 of the U-shaped support 3, against indentations 8, 9 of the legs of the U and against the inner faces 52, 53 of the respective flanges 29, 31. The outer taller section 46 extends into the cover 3, where it rests against the front section 20 of the cover 3. The section 46 is so shaped and of such height as to delimit an upper and a lower open space 54, 55 at the legs 21 and 22, respectively, of the cover 3. In a transition zone between the inner shorter section 45 and the outer taller section 46, a stop face 56 is formed in the energy absorbing mechanism. The stop face either rests against or, as in the illustrated case, is designed to be brought into contact with the cover 3. The stop face 56 extends essentially in a vertical plane, and in particular extends essentially parallel to the upper and lower wall section 26, 27, respectively, and to flanges 12, 13 respectively, and is arranged at a distance A from the wall sections 26, 27 of the cover 3 which does not exceed 3 cm. Since the gap of distance A also provides a space between the stop face 56 and the support 2, a certain delay is experienced before the energy absorbing mechanism 4 achieves contact with the support 2. This delay is advantageous from the point of view of energy absorption. Distance A does not exceed 3 cm in this embodiment because practical tests have shown that it is inappropriate to have a longer distance on a medium sized passenger car, because the risk that the cover will loosen in a collision increases with the distance A of the gap.

The statement that the stop face 56 extends essentially in a vertical plane means that it deviates from the vertical plane by a maximum of ±45 degrees. In an advantageous design, the maximum deviation from the vertical plane is ±25 degrees.

Energy absorbing mechanism 4 can either consist of a single, continuous absorbent material block or be comprised of a number of blocks which are combined together to extend over the vehicle width.

The shape and elasticity of the cover 3 allows its simple assembly because the cover 3 can be clamped to grip the support 2 throughout its length, thereby enclosing the energy absorbing mechanism 4. The cover 3 is secured to the support 2 by means of locking mechanisms 28, 30, which hold the sections 2, 3 together during normal handling, i.e during assembly and during normal operation of the vehicle. In the event of a collision, the cover 3 tends to be ripped off, because the locking mechanisms 28, 30 may be unable to resist the crash forces. But, because some part of the cover 3, particularly the inwardly directed wall sections 26, 27, extends between the stop face 56 on the energy absorbing mechanism 4 and the outwardly directed flanges 12, 13 of the support 2, the cover 3 is pressed in a locking action against the support by the stop face of the energy absorbing mechanism. Although there is normally a gap of a distance A of up to 3 cm between the cover 3 and stop face 56 in a selected embodiment of the invention, which is designed for a medium sized vehicle, the cover 3 has not enough time to be ripped off before the parts 2, 4, 3 are brought into clamping contact with each other by the collision forces.

The invention can be applied both to the front bumper and/or the rear bumper of the vehicle.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A bumper for a motor vehicle, comprising:

a support which extends horizontally across and is attached to an end of the vehicle, the support including first and second vertically spaced apart sections extending generally horizontally and away from the end of the vehicle and an intermediate section extending between and supporting the first and second sections; the first and second sections having respectively a first and second flange thereon, the first and second flanges extending generally in the vertical direction;

a cover at least in part covering the support from the side of the support that is outward of the vehicle end; a locking mechanism for locking the cover to the support;

the cover including a third wall section extending generally vertically and at the side of the first flange outward of the end of the vehicle and including a fourth wall section also extending generally vertically and at the side of the second flange outward of the end of the vehicle, wherein the third wall section is engageable with the first flange and the fourth wall section is engageable with the second flange, the third and fourth wall sections being outwards with respect to the end of the vehicle of the first and second flanges, respectively; the cover also having an outward part outward of the third and fourth sections with respect to the end of the vehicle, at least partially covering the support;

an energy absorbing mechanism arranged between the outward part of the cover and the support, the energy absorbing mechanism being deformable when subject to at least a predetermined force; the energy absorbing mechanism being so shaped and located that when the outer part of the cover has at least the predetermined force applied to it, the cover moves tho energy absorbing mechanism to press against the side of the third and fourth sections which is outward of the first and second flanges with respect to the end of the vehicle, for pressing the third and fourth sections against the first and second flanges of the support, respectively, for preventing the third and fourth sections and the cover from being released and separated from the support upon the application of at least the predetermined force to the cover;

the first and second flanges projecting vertically from the respective generally horizontally extending first and second sections and away from each other and the third and fourth sections project generally vertically inwardly and toward each other from the cover;

the inwardly directed third and fourth sections cooperating to define a wall defining a rear limit of a cavity in the cover which extends longitudinally through the cover toward the support and laterally across the cover between the sides of vehicle; the energy absorbing mechanism being disposed in the cavity of the cover and being engageable with the third and fourth sections;

the wall in the cover defined by the third and fourth sections having a longitudinal opening through it defined from above and below by the third and fourth sections and the longitudinal opening running in the horizontal direction laterally between the sides of the vehicle, separating the third and fourth sections; and each of the third and fourth sections of the cover including a respective fifth section which is vertically further out from the respective one of the first and second sections to which the third or fourth section is near and a respective sixth section which is vertically nearer to the respective one of the first and second sections to which the third or fourth section is near, the fifth and sixth sections extending from the respective one of the third and fourth sections and toward the end of the vehicle.

2. A bumper for a motor vehicle, comprising:

a support which extends horizontally across and is attached to an end of the vehicle, the support including first and second vertically spaced apart sections extending generally horizontally and away from the end of the vehicle and an intermediate section extending between and supporting the first and second sections; the first and second sections having respectively a first and second flange thereon, the first and second flanges extending generally in the vertical direction;

a cover at least in part covering the support from the side of the support that is outward of the vehicle end; a locking mechanism for locking the cover to the support;

the cover including a third wall section extending generally vertically and at the side of the first flange outward of the end of the vehicle and including a fourth wall section also extending generally vertically and at the side of the second flange outward of the end of the vehicle, wherein the third wall section is engageable with the first flange and the fourth wall section is engageable with the second flange, the third and fourth wall sections being outwards with respect to the end of the vehicle of the first and second flanges, respectively; the cover also having an outward part outward of the third and fourth sections with respect to the end of the vehicle, at least partially covering the support;

an energy absorbing mechanism arranged between the outward part of the cover and the support, the energy absorbing mechanism being deformable when subject to at least a predetermined force; the energy absorbing mechanism being so shaped and located that when the outer part of the cover has at least the predetermined force applied to it, the cover moves the energy absorbing mechanism to press against the side of the third and fourth sections which is outward of the first and second flanges with respect to the end of the vehicle, for pressing the third and fourth sections against the first and second flanges of the support, respectively, for preventing the third and fourth sections and the cover from being released and separated from the support upon the application of at least the predetermined force to the cover;

the first and second flanges projecting vertically from the respective generally horizontally extending first and second sections and away from each other and the third and fourth sections project generally vertically inwardly and toward each other from the cover;

the inwardly directed third and fourth sections cooperating to define a wall defining a rear limit of a cavity in the cover which extends longitudinally through the cover toward the support and laterally across the cover between the sides of vehicle; the energy absorbing mechanism being disposed in the cavity of the cover and being engageable with the third and fourth sections;

the wall in the cover defined by the third and fourth sections having a longitudinal opening through it defined from above and below by the third and fourth sections and the longitudinal opening running in the horizontal direction laterally between the sides of the vehicle, separating the third and fourth sections;

a respective fifth section supported on each of the third and fourth sections and extending from the third and fourth sections toward the end of the vehicle; and the locking mechanism comprising first locking means on the fifth section, and cooperating second locking means on the support such that the first and second locking means cooperate to lock the cover to the support.

3. The bumper of claim 2, wherein the first locking means comprises a hook on the fifth section and the cooperating second locking means on the support comprises the respective one of the first and second flanges, the hook and the flange being so shaped and placed that the hook by snap action engages the flange to lock the cover to the support.

4. The bumper of claim 2, further comprising a respective sixth section on each of the third and fourth sections and extending toward the end of the vehicle; each sixth section having a first support face in contact with a respective adjacent one of the first and second sections of the support and having a second opposite support face in contact with the energy absorbing mechanism;

the energy absorbing mechanism extending toward the end of the vehicle sufficiently to be in contact with the second support face of the sixth section, the contact between the second support face and the energy absorbing mechanism being for fixing the position of the sixth section and thereby the position of the cover with respect to the position of the support and the energy absorbing mechanism.

5. A bumper for a motor vehicle, comprising:

a support which extends horizontally across and is attached to an end of the vehicle, the support including first and second vertically spaced apart sections extending generally horizontally and away from the end of the vehicle and an intermediate section extending between and supporting the first and second sections; the first and second sections having respectively a first and second flange thereon, the first and second flanges extending generally in the vertical direction;

a cover at least in part covering the support from the side of the support that is outward of the vehicle end; a locking mechanism for locking the cover to the support;

the cover including a third wall section extending generally vertically and at the side of the first flange outward of the end of the vehicle and including a fourth wall section also extending generally vertically and at the side of the second flange outward of the end of the vehicle, wherein the third wall section is engageable with the first flange and the fourth wall section is engageable with the second flange, the third and fourth wall sections being outwards with respect to the end of the vehicle of the first and second flanges, respectively; the cover also having an outward part outward of the third and fourth sections with respect to the end of the vehicle, at least partially covering the support;

an energy absorbing mechanism arranged between the outward part of the cover and the support, the energy absorbing mechanism being deformable when subject to at least a predetermined force; the energy absorbing mechanism being so shaped and located that when the outer part of the cover has at least the predetermined force applied to it, the cover moves the energy absorbing mechanism to press against the side of the third and fourth sections which is outward of the first and second flanges with respect to the end of the vehicle, for pressing the third and fourth sections against the first and second flanges of the support, respectively, for preventing the third and fourth sections and the cover from being released and separated from the support upon the application of at least the predetermined force to the cover;

the first and second flanges projecting vertically from the respective generally horizontally extending first and second sections and away from each other and the third and fourth sections project generally vertically inwardly and toward each other from the cover;

the inwardly directed third and fourth sections cooperating to define a wall defining a rear limit of a cavity in the cover which extends longitudinally through the cover toward the support and laterally across the cover between the sides of vehicle; the energy absorbing mechanism being disposed in the cavity of the cover and being engageable with the third and fourth sections;

the wall in the cover defined by the third and fourth sections having a longitudinal opening through it defined from above and below by the third and fourth sections and the longitudinal opening running in the horizontal direction laterally between the sides of the vehicle, separating the third and fourth sections;

a respective fifth section on each of the third and fourth sections and extending toward the end of the vehicle, each fifth section having a first support face in contact with a respective adjacent one of the first and second sections of the support and a second opposite support face in contact with the energy absorbing mechanism; and the energy absorbing mechanism extending toward the end of the vehicle sufficiently to be in contact with the second support face of the fifth section, the contact between the second support face and the energy absorbing mechanism being for fixing the position of the fifth section and thereby the position of the cover with respect to the positions of the support, the cover and the energy absorbing mechanism.

6. A bumper for a motor vehicle, comprising:

a support which extends horizontally across and is attached to an end of the vehicle, the support including first and second vertically spaced apart sections extending generally horizontally and away from the end of the vehicle and an intermediate section extending between and supporting the first and second sections; the first and second sections having respectively a first and second flange thereon, the first and second flanges extending generally in the vertical direction;

a cover at least in part covering the support from the side of the support that is outward of the vehicle end; a locking mechanism for locking the cover to the support;

the cover including a third wall section extending generally vertically and at the side of the first flange outward of the end of the vehicle and including a fourth wall section also extending generally vertically and at the side of the second flange outward of the end of the vehicle, wherein the third wall section is engageable with the first flange and the fourth wall section is engageable with the second flange, the third and fourth wall sections being outwards with respect to the end of the vehicle of the first and second flanges, respectively; the cover also having an outward part outward of the third and fourth sections with respect to the end of the vehicle, at least partially covering the support;

an energy absorbing mechanism arranged between the outward part of the cover and the support, the energy absorbing mechanism being deformable when subject to at least predetermined force; the energy absorbing mechanism being so shaped and located that when the outer part of the cover has at least the predetermined force applied to it, the cover moves the energy absorbing mechanism to press against the side of the third and fourth sections which is outward of the first and second flanges with respect to the end of the vehicle, for pressing the third and fourth sections against the first and second flanges of the support, respectively, for preventing the third and fourth sections and the cover from being released and separated from the support upon the application of at least the predetermined force to the cover;

the support being generally U-shaped with the vertically separated generally horizontally first and second extending sections defining the legs of the U, and the legs of the U having respective inwardly facing, opposed surfaces;

respective extensions from the third and fourth sections of the cover extending along the inwardly facing surfaces of the first and second sections of the support;

the energy absorbing mechanism including a part extending past and in engagement with the extensions from the third and fourth sections of the cover and the energy absorbing mechanism is so shaped that in the event of a shock absorbing deformation of the energy absorbing mechanism, the energy absorbing mechanism presses at least one of the extensions of the third and fourth sections of the cover against the respective inwardly facing surface of the first and second sections;

each of the first and second flanges being directed outwardly away from the other flange and includes an end portion which is directed toward the end of the vehicle and defining part of the locking mechanism; and the locking mechanism further comprising a respective locking means defined on each of the third and fourth sections of the cover for engaging the end portion of the respective first and second flanges and for locking the cover on the support.

* * * * *